United States Patent
Bedell

(10) Patent No.: US 8,313,718 B2
(45) Date of Patent: Nov. 20, 2012

(54) METHOD AND COMPOSITION FOR REMOVAL OF MERCAPTANS FROM GAS STREAMS

(75) Inventor: Stephen A. Bedell, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 147 days.

(21) Appl. No.: 12/517,198

(22) PCT Filed: Dec. 11, 2007

(86) PCT No.: PCT/US2007/087074
§ 371 (c)(1),
(2), (4) Date: Jun. 2, 2009

(87) PCT Pub. No.: WO2008/073935
PCT Pub. Date: Jun. 19, 2008

(65) Prior Publication Data
US 2010/0028232 A1    Feb. 4, 2010

Related U.S. Application Data

(60) Provisional application No. 60/874,553, filed on Dec. 13, 2006.

(51) Int. Cl.
*C01B 17/00* (2006.01)
*B01D 53/56* (2006.01)
*B01D 53/50* (2006.01)
*B01D 53/46* (2006.01)

(52) U.S. Cl. ............ 423/242.1; 423/242.2; 423/243.01; 423/210

(58) Field of Classification Search .................. None
See application file for complete search history.

(56) References Cited

U.S. PATENT DOCUMENTS

| | | | | |
|---|---|---|---|---|
| 4,303,787 A | * | 12/1981 | Horikoshi et al. | ............ 536/103 |
| 4,336,233 A | | 6/1982 | Appl et al. | |
| 4,426,292 A | * | 1/1984 | Wernick et al. | ............... 210/635 |
| 4,547,365 A | | 10/1985 | Kubo et al. | |
| 4,548,811 A | | 10/1985 | Kubo et al. | |
| 4,997,630 A | | 3/1991 | Wagner et al. | |
| 5,019,361 A | | 5/1991 | Hakka | |
| 5,371,209 A | * | 12/1994 | Shieh et al. | ............ 560/103 |
| 5,472,613 A | * | 12/1995 | Schofield | ............ 210/634 |
| 5,534,165 A | * | 7/1996 | Pilosof et al. | ............ 252/8.91 |
| 5,700,438 A | | 12/1997 | Miller | |
| 6,136,071 A | | 10/2000 | Lamartine et al. | |
| 6,287,603 B1 | | 9/2001 | Prasad et al. | |
| 6,334,949 B1 | | 1/2002 | Bruno et al. | |
| 6,337,059 B1 | | 1/2002 | Schubert et al. | |
| 6,528,566 B2 | | 3/2003 | Duvall et al. | |
| 6,531,103 B1 | | 3/2003 | Hakka et al. | |
| 6,740,230 B1 | | 5/2004 | Hugo et al. | |
| 6,869,466 B2 | | 3/2005 | Day et al. | |
| 7,425,314 B2 | | 9/2008 | Van De Graaf | |
| 7,517,389 B2 | | 4/2009 | Van De Graaf et al. | |
| 2003/0022573 A1 | * | 1/2003 | Cintio et al. | ............ 442/96 |
| 2003/0113902 A1 | * | 6/2003 | Gordon et al. | ............ 435/262.5 |
| 2004/0048955 A1 | * | 3/2004 | Wada et al. | ............ 524/9 |
| 2004/0122385 A1 | * | 6/2004 | Morman et al. | ............ 604/359 |
| 2005/0089540 A1 | * | 4/2005 | Uchiyama et al. | ............ 424/401 |
| 2005/0166756 A1 | | 8/2005 | Brok et al. | |

FOREIGN PATENT DOCUMENTS

JP   3649441        2/2005
JP   2005170811     6/2005

OTHER PUBLICATIONS

Mikhail V. Rekharsky, et al., "Complexation Thermodynamics of Cyclodextrins", Chem. Rev., 1998, 1875-1917.

* cited by examiner

*Primary Examiner* — Melvin C Mayes
*Assistant Examiner* — Sheng H Davis
(74) *Attorney, Agent, or Firm* — John J. Gresens, Esq.; Troutman Sanders LLP

(57) ABSTRACT

A composition for removing mercaptan from a gas stream containing at least one acid gas in addition to a mercaptan, the composition comprising a physical and/or chemical solvent for $H_2S$ and an inclusion compound for the mercaptan. A process of treating gas stream using the composition. The inclusion compound is selected from the group consisting of, cyclodextrin, cryptand, calixarene, cucurbituril. The chemical solvent may be monoethanolamine (MEA), diethanolamine (DEA), triethanolamine (TEA, diisopropylamine (DIPA), diglycolamine (DGA) and methyldiethanolamine (MDEA). Examples of useful physical solvents include cyclotetramethylene sulfone (sulfolane) and its derivatives, aliphatic acid amides, NMP (n-methylpyrrolidone), N-alkylated pyrrolidones and corresponding piperidone, methanol and mixtures of dialkethers of polyethylene glycols. The method comprises scrubbing preferably the natural gas with an aqueous solution comprising the above compounds followed by a stripping regeneration step.

8 Claims, No Drawings

METHOD AND COMPOSITION FOR REMOVAL OF MERCAPTANS FROM GAS STREAMS

CROSS REFERENCE TO RELATED APPLICATIONS

This application is a 371 of PCT/US2007/087074 filed Dec. 11, 2007, which claims the benefit of U.S. Provisional Application Ser. No. 60/874,553, filed Dec. 13, 2006.

BACKGROUND OF THE INVENTION

The present invention relates to an improved composition for removing both $H_2S$ and mercaptans from a gas stream using an aqueous scrubbing solution.

Gases containing acid gases, such as one or more of $CO_2$, COS and $H_2S$, such as gas streams from natural gas wells, also in many instances contain undesirable quantities of mercaptans. Solvents known in the art as "physical solvents" and "chemical solvents" and/or mixtures thereof are useful for the absorption of acid gases from these types of gas streams. This process is often referred to as scrubbing or washing of the gas stream. When using a chemical solvent typically an acid gas rich gas stream is contacted (scrubbed) with an aqueous composition comprising an amine solution at low temperature or high pressure in an absorber to produce a gas stream containing a lesser amount of the acid gases and an acid gas enriched aqueous solution. The aqueous amine solution usually contains an alkanolamine such as triethanolamine (TEA), methyldiethanolamine (MDEA), diethanolamine (DEA), monoethanolamine (MEA), diisopropanolamine (DIPA) hydroxyaminoethyl ether or diglycol amine (DGA). Typical physical solvents include cyclotetramethylenesulfone (sulfolane) and its derivatives, aliphatic acid amides, NMP (n-methylpyrrolidone), N-alkylated pyrrolidones and corresponding piperidones, methanol and mixtures of dialkylethers of polyethylene glycols. An aqueous mixture of a chemical solvent, for example DIPA and/or MDEA and a physical solvent, for example sulfolane, can also be used. A physical solvent employs nonreactive interactions to dissolve the acid gas while the chemical solvent adds a reaction to enhance the degree of acid gas removal. A sufficient amount of the acid gases are removed from the gas stream to render the gas suitable for sale or additional downstream conditioning. The acid gas enriched solution is regenerated for reuse by driving off the absorbed acid gases in specialized equipment such as flash tanks and/or stripper columns typically operated at high temperature or low pressure and the chemical or physical solvent is reused in the process. In the past it has, however, been difficult to remove mercaptans from gas streams during the absorption step because even though the mercaptan is an acid gas it is a weaker acid than either $H_2S$ or $CO_2$ and thus is not normally removed along with these other acid gases.

Mercaptans are substituted forms of $H_2S$ in which a hydrocarbyl moiety, R, takes the place of one of the hydrogen atoms. Their general formula is RSH. The properties of mercaptans depend substantially on the length of the hydrocarbon chain. Mercaptans in aqueous solution likewise act as acids, but are significantly weaker than $H_2S$. With increasing length of the hydrocarbon chain, therefore, mercaptans behave like hydrocarbons, which make their removal from hydrocarbon gas streams particularly difficult because the physical or chemical solvent prefers to take out the $H_2S$ and or $CO_2$. Mercaptans occur in some natural gas sources, especially on the North American continent, and are typically present in most liquid or liquefied refined hydrocarbon products (LPG). However, because of their corrosive and malodorous properties, it is usually preferred to remove mercaptans from hydrocarbon gases. Treated and purified hydrocarbons for polymerization reactions, for example, should customarily contain not more than 1-20 ppm of mercaptans.

It is known that certain compounds, such as piperazine and monomethylethanolamine (MMEA) may be advantageously added to aqueous amine solutions and mixtures of chemical and physical solvents to enhance their absorption capabilities. For example, U.S. Pat. No. 4,336,233 discloses a process for removing $CO_2$, $H_2S$ and in some cases COS from gases that contain these compounds by washing the gases with aqueous solutions containing MDEA and piperazine as an absorption promoter. The amount of piperazine stated to be useful in these absorption compositions is up to 0.8 moles per liter of aqueous solution. The '233 patent also discloses that it is particularly preferred to add from 0.05 to 0.4, especially from 0.2 to 0.4, moles piperazine per liter of aqueous solution. However, the addition of these materials is not disclosed as improving the removal of mercaptans.

U.S. Pat. No. 4,997,630 discloses a staged process for the removal of $CO_2$ and/or $H_2S$ using an aqueous absorption liquid containing MDEA. The aqueous absorption liquid may additionally contain from 0.05 to 1, preferably 0.1 to 0.8, mole per liter piperazine.

U.S. Pat. No. 6,337,059 teaches that an improved absorption compositions for the removal of acid gases from gas streams that comprise aqueous MDEA/piperazine solutions containing greater than 1 mole piperazine per liter of aqueous solution. In particular, aqueous solutions containing greater than 1 mole piperazine per liter of aqueous solution and about 1.5 to about 6 moles MDEA per liter of aqueous solution were found to provide superior absorption capabilities over aqueous MDEA/piperazine solutions containing 1 mole or less piperazine per liter of aqueous solution. It also teaches that MDEA/piperazine absorption compositions advantageously provide equivalent $CO_2$ removal at reduced absorption composition circulation rates in the absorber and increased absorber temperature, as well as improved performance of downstream regeneration equipment. However, none of these piperazine processes effectively remove mercaptans from the gas.

U.S. Patent Application Publication 2005/0166756 discloses a process for the removal of carbon dioxide from a gas stream containing carbon dioxide by washing the gas with an aqueous washing solution containing between 15 and 45 parts of water by weight, based on total solution weight, between 15 and 40 parts of sulfolane, and between 30 and 60 parts of a secondary or tertiary amine derived from ethanol amine, wherein the amounts of water, sulfolane and amine together equal 100 parts by weight, the process being carried out in the presence of a primary or secondary amine compound in an amount between 0.5 and 15 wt % based on water, sulfolane and amine.

U.S. Pat. No. 6,740,230 teaches a process for removing mercaptans from a fluid stream by contacting the fluid stream in an absorption or extraction zone with a scrubbing liquor having 1) at least one tertiary aliphatic alkanolamine of 3-12 carbon atoms, and 2) from 0.5 to 15% by weight of at least one activator selected from the group consisting of saturated 5-membered heterocyclic, saturated 6-membered heterocyclic, and a mixture thereof.

WO 2004/047955 teaches a process for the removal of mercaptans from a gas stream by using an aqueous absorption composition having 10 to 40 wt % of a physical solvent and 20 to 60 wt. % of an amine. The physical solvent utilized is sulfolane. After the absorption step, the treated gas runs through a molecular sieve for further removal of mercaptans.

Cyclodextrins are known to absorb (form inclusion complexes with) organic molecules or portions of organic molecules and have been used in aqueous solutions to absorb mercaptans from surfaces, see U.S. Pat. No. 5,534,165, and also to function in hair waving solutions to remove the mercaptan smell, see U.S. Pat. No. 4,548,811.

Despite the existence of various absorption compositions for mercaptan removal, there still exists a need for an improved composition and method that can have a better absorption capacity for mercaptans from hydrocarbon gases that also contain stronger acid gases such as $H_2S$ and $CO_2$.

SUMMARY OF THE INVENTION

In the present invention a gas scrubbing solution containing a chemical or physical solvent or mixture thereof used for removing $H_2S$ and $CO_2$ from a hydrocarbon gas stream also containing a mercaptan is improved by adding an effective amount of a mercaptan inclusion compound to simultaneously remove the mercaptans and $H_2S$ and $CO_2$ from the hydrocarbon gas.

In one embodiment the invention includes a process for removing mercaptan from a gas stream containing at least one additional acid gas comprising:

(1) contacting in an absorbing zone, a gas comprising a mercaptan and a non-mercaptan acid gas with a solution of (a) a chemical solvent, a physical solvent or a mixture of chemical and physical solvents for the non-mercaptan acid gas and (b) an effective amount of at least one inclusion compound for said mercaptan, under conditions such that at least some of the mercaptan is taken up by the inclusion compound, and (2) providing at least a portion of a rich solvent effluent stream from step (1) to a stripping zone wherein the majority of the mercaptan is separated from the inclusion compound, and the mercaptan is substantially removed from the solvent, and returning a regenerated solvent to the absorber.

Surprisingly, the inclusion compound is regenerated in the stripping column

DETAILED DESCRIPTION OF THE INVENTION

The present invention relates to a scrubbing solution for removing impurities from a hydrocarbon gas, the impurities comprising $H_2S$ and/or $CO_2$ and at least one mercaptan.

The absorption (scrubbing) composition of the present invention comprises a solution of a chemical solvent or physical solvent or mixture thereof and an effective amount of an inclusion compound, e.g. a cyclodextrin, that can effect the simultaneous removal of mercaptan and $H_2S$ and/or $CO_2$ from a hydrocarbon gas stream containing the same. The compositions of the invention preferably are aqueous solutions.

Unless otherwise stated, all percentages, (%), are by weight based on the total weight of the composition.

As used herein a "host-guest" ("inclusion") complex contains a host compound, referred to herein as an inclusion compound, that forms a cavity in which the mercaptan molecule, the guest, can be held. The mercaptan is actually trapped inside the inclusion complex so that it can be removed at the same time that the $H_2S/CO_2$ is being removed from the hydrocarbon gas.

The inclusion compound advantageously is a cyclodextrin, calixarene, cucurbituril, a cryptand or a mixture thereof. As used herein "cyclodextrin" means compounds containing D-glucose units joined through alpha 1-4 linkages in such a way as to form a ring. Compounds containing six, seven or eight glucose molecules are referred to as alpha, beta and gamma cyclodextrins, respectively. Included as useful compounds are those cyclodextrins disclosed in U.S. Pat. No. 5,534,165 at column 3, line 31 through column 5, line 30, the teachings of which are specifically incorporated herein by reference.

A cryptand is a synthetic bi- or polycyclic multidentate ligand. It is a macropolycyclic polyazo-polyether, where the three-coordinate nitrogen atoms provide the vertices of a 3-dimensional structure.

A calixarene is a macrocycle or cyclic oligomer based on a hydroxyalkylation product of a phenol and an aldehyde. It a cyclic structure containing the $(ArCH_2)_n$, group where Ar represents an aryl group. A description of calixarene compounds useful in the practice of the present invention can be found in U.S. Pat. No. 6,136,071, the teachings of which are specifically incorporated herein by reference.

A cucurbituril is a cyclic chemical compound consisting of six units of glycoluril. Cucurbiturils that can be used in the practice of the present invention are disclosed in, for example, U.S. Pat. No. 6,869,466 B2, the teachings of which are specifically incorporated herein by reference.

A chemical solvent works on the basis of chemical reactions that convert for example the acid gases into compounds that are more soluble in the solvent. For example aqueous solutions containing an alkanolamine form salts with acid gases, such as $H_2S$, and these salts can be stripped from the acid gas enriched scrubbing solution by heat or steam. Useful alkanolamines include for example monoethanolamine (MEA), diethanolamine (DEA), triethanolamine (TEA), diisopropylamine (DIPA), diglycolamine (DGA) and methyldiethanolamine (MDEA).

A physical solvent is one that functions through the absorption of the acid gases, i.e. the acid gases dissolve in the physical solvent. Examples of useful physical solvents include cyclotetramethylene sulfone (sulfolane) and its derivatives, aliphatic acid amides, NMP (N-methylpyrrolidone), N-alkylated pyrrolidones and corresponding piperidones, methanol and mixtures of dialkethers of polyethylene glycols.

The solvent composition can, in addition to the inclusion compound, comprise at least one chemical solvent, at least one physical solvent, or any mixture thereof. When the composition is an aqueous solution, the amount of chemical solvent in the aqueous composition advantageously is from about 0 to about 70 wt. %, and preferably is from about 30 to about 50 wt. %, and the amount of physical solvent in the aqueous composition advantageously is from about 0 to 99 wt. %, while in one embodiment of the invention the amount of physical solvent in the aqueous composition is from 20 to about 50 wt. % based on the total weight of the composition, the remainder being water and the inclusion compound in order to bring the total percentage to 100%. The solvent composition of the invention can be a concentrate, or can be fully diluted to its "as used" composition.

In one embodiment of the invention, the solvent composition is free of water.

The composition of the present invention contains an effective amount of an inclusion compound such as a cyclodextrin, preferably an alpha cyclodextrin. The amount of the inclusion compound will depend on the specific one chosen but in general will range from about 0.1 to about 10 wt. %, preferably from about 1 to about 5 wt. % of the aqueous scrubbing solution.

The absorption composition may also contain additives such as corrosion inhibitors, defoamers, and the like. Typically, the concentration of such additives ranges from about 0.01 to about 5 wt. %. The use of such additives is well known to those skilled in the art.

Any gas containing an acid gas can be treated according to the present invention. The sources of such gases are not critical to the invention and include, for example, natural gas from wells, synthesis gas streams and refinery gas, including refinery coker off-gas, refinery fluid catalytic cracker off-gas, gas from refinery hydrogen units, and other refinery gas streams. Typically, these gas streams contain one or more of the following acid gases: mercaptans, $CO_2$, $H_2S$, and COS. It is also not uncommon for these gas streams to contain one or more of the following: $SO_2$, $SO_3$, $CS_2$, HCN and oxygen. Mercaptans are often present in amounts ranging from about 10 to 10,000 ppm. They are most commonly found as methyl, ethyl, n-propyl, i-propyl, n-butyl, i-butyl, and sec-butyl mercaptans.

Gas streams containing acid gases are treated to remove the acid gases by contacting them with the absorption (scrubbing) composition of the present invention. Preferably, the used absorption composition, that is, the acid gas-rich absorption composition, is regenerated to remove all or part of the absorbed acid gases, and then recycled to the absorption process. The inclusion compound forms a reversible complex with the mercaptan in the absorber. The equilibrium reverses at the higher temperature of the stripper. Mercaptan is removed in the stripper and the regenerated scrubbing composition containing the chemical, physical solvent or mixture thereof and the inclusion compound is returned to the absorber. Any equipment known in the art may be used for absorption, regeneration, and the rest of the process.

In accordance with the preferred aspects of the invention, at least 25% of the mercaptan is taken up by the inclusion compound, and preferably at least 30% of the mercaptan is taken up by the inclusion compound in the absorbing zone. In the stripping zone, at least 60%, and preferably at least 75%, of the mercaptan is separated from the inclusion compound.

In accordance with one embodiment, the invention is a process for removing mercaptans from a gas stream containing at least one additional acid gas. The process includes contacting in an absorbing zone, a gas comprising a mercaptan and a non-mercaptan acid gas with a solution of a chemical solvent, a physical solvent or a mixture of chemical and physical solvents for the non-mercaptan acid gas. The composition also comprises an effective amount of at least one inclusion compound for the mercaptan, under conditions such that at least some of the mercaptan is taken up by the inclusion compound. The process then includes providing at least a portion of a rich solvent effluent stream from the first step to a stripping zone. In the stripping zone the majority of the mercaptan is separated from the inclusion compound, and the mercaptan is substantially removed from the solvent, and returning a regenerated solvent to the absorber.

In some situations where further removal of mercaptans is needed, the treated gas stream may be passed through a filter media such as molecular sieve.

Many different processes may be utilized to accomplish to gas absorption process. U.S. Pat. No. 6,337,059, the teachings of which are included herein by reference, illustrates a typical process for the removal of acid gases and can be similarly applied with the composition of the present invention.

In the following detailed description, the specific embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the invention is not limited to the specific embodiments described below, but rather; the invention includes all alternatives, modifications, and equivalents falling within the true scope of the appended claims.

Example 1

A laboratory glass apparatus is used to simulate a typical commercial plant used to remove acid gases from a hydrocarbon stream. The laboratory apparatus consisted of one absorber (used to contact the gas stream with the test scrubbing solution) and one stripper (to regenerate the scrubbing solution). This rig has the absorber and the stripper with absorption and regeneration in a closed solvent cycle. Except for the pressure, which can not be more than a few pounds (psi) above atmospheric because of its glass construction, it has the basic features of its commercial counterpart. Process parameters, such as liquid and gas flow rate, stream temperatures, etc. can be changed as required.

Three compressed gas cylinders $N_2$ (99%), mercaptan (2000 ppm butyl mercaptan balanced with $N_2$) and hydrogen sulfide (5% balanced with $N_2$) supplied by AIRGAS provide the gas source. Victor compressed gas regulators were used to scale down the cylinders pressures before entering the system at 10 psig. From the Victor regulators the gas individually flows into a set of auxiliary regulators controlled by an Aalborg 4-Channel Gas Flow Controller from which the gases mix and enter the rig at the bottom of the absorber. Sample gases are sent to a GC where they are separated by a Restek MXT-1 SILCOSTEEL-treated stainless steel 0.53 mm ID, 60 meter column. Analysis of sample gases is provided by a Sievers 355 Sulfur Chemiluminescence Detector (SCD).

The rig is charged with 750 g of 50% aqueous MDEA. The amine rate is set at 20 mL/min while the gas rate is set to 2000 SCCM. Initially, the gas composition is 100% $N_2$ to allow for the system to reach a state of equilibrium before starting the addition of acid gases. Once the system reaches a constant state at 40° C., 1.75% $H_2S$ and 325 ppm butyl mercaptan (balanced with $N_2$) at 2000 SCCM is then introduced to the absorber. The rig is then allowed to equilibrate for an hour and the resulting sweet gas is analyzed for percent removal of butyl mercaptan. Enough α-cyclodextrin (Wacker Fine Chemicals CAS#10016-20-3, Batch#60F202) is then added to achieve 0.3 wt %. The system is then allowed to equilibrate over a period of one hour and the sweet gas is then analyzed for % removal of butyl mercaptan. Finally, a second addition of α-cyclodextrin is performed to give 5.9 wt % and then the sweet gas analyzed for % removal of butyl mercaptan after 1.5 hours of equilibration time.

After each addition of cyclodextrin, while expecting the removal percentage to spike and then decrease, the experiments surprisingly operate at steady state (constant removal percentage), indicating that the cyclodextrin mercaptan complex is regenerated in the stripper.

The results of the test are set forth in the following Table.

TABLE 1

Mercaptan Removal Aqueous Compositions

| wt % cyclodextrin | Ppm butylmercaptan |
| --- | --- |
| 0 | 261 |
| 0.3 | 262 |
| 5.9 | 219 |

Based on the inlet 325 ppm of butyl mercaptan the addition of the cyclodextrin increased the removal of mercaptan from 20% without to 33% with addition of the cyclodextrin. This represents a removal improvement of 65% ((33−20)/20).

What is claimed is:

1. A process for removing mercaptan derived from a hydrocarbon gas from a fossil fuel and/or refinery gas stream containing at least one additional acid gas comprising:
   (1) contacting in an absorbing zone, a gas comprising a mercaptan and a non-mercaptan acid gas with a solution of (a) a chemical solvent, a physical solvent or a mixture of chemical and physical solvents for the non-mercaptan acid gas and (b) an effective amount of at least one inclusion compound solubilized in said solution for said mercaptan, wherein the inclusion compound is selected from the group consisting of cyclodextrins, calixarenes, cucurbiturils and a mixture of one or more thereof, under conditions such that at least some of the mercaptan is taken up by the inclusion compound, and
   (2) providing at least a portion of a solvent rich effluent stream from step (1) to a stripping zone wherein the majority of the mercaptan is separated from the inclusion compound, and the mercaptan is substantially removed from the solvent, and returning a regenerated solvent to the absorbing zone.

2. The process of claim 1 wherein at least 60% of the mercaptan is separated from the inclusion compound.

3. The process of claim 1 wherein at least 75% of the mercaptan is separated from the inclusion compound.

4. The process of claim 1 wherein at least 25% of the mercaptan is taken up by the inclusion compound in step (1).

5. The process of claim 1 wherein at least 30% of the mercaptan is taken up by the inclusion compound in step (1).

6. The process of claim 1 wherein the inclusion compound is from 0.1 to 10 weight percent of the solution.

7. The process of claim 1 wherein the inclusion compound comprises a cyclodextrin.

8. The process of claim 1 wherein the inclusion compound comprises an alpha-cyclodextrin.

* * * * *